Figure 1:
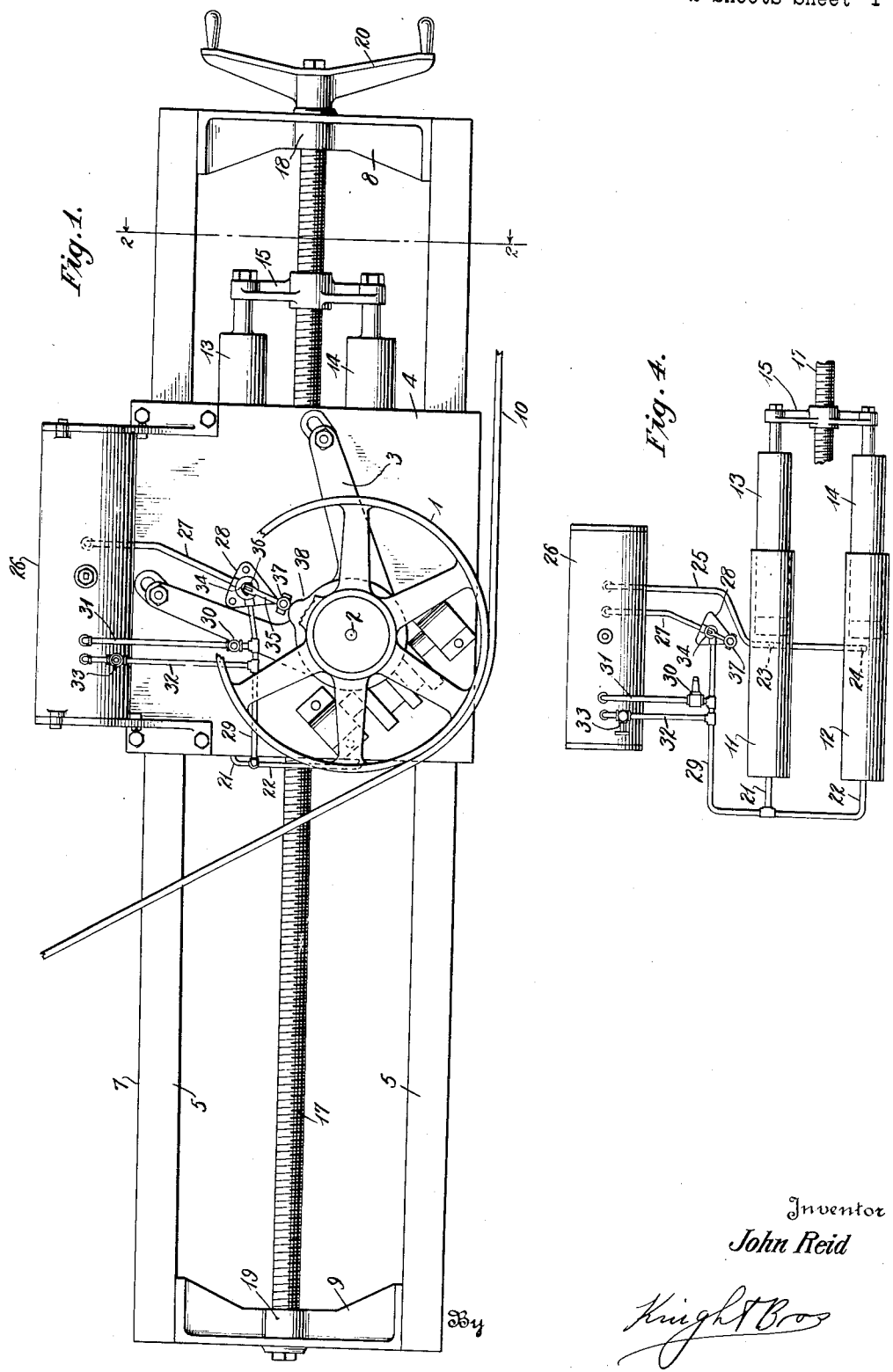

Oct. 10, 1933.    J. REID    1,929,852
HYDRAULIC BELT TIGHTENER
Filed April 11, 1930    2 Sheets-Sheet 1

Inventor
John Reid
By
Knight Bros
Attorneys

Oct. 10, 1933.  J. REID  1,929,852
HYDRAULIC BELT TIGHTENER
Filed April 11, 1930   2 Sheets-Sheet 2

Inventor
John Reid

By Knight Bros
Attorneys

Patented Oct. 10, 1933

1,929,852

UNITED STATES PATENT OFFICE 1,929,852

HYDRAULIC BELT TIGHTENER

John Reid, Oil City, Pa.

Application April 11, 1930. Serial No. 443,546

3 Claims. (Cl. 64—5)

This invention relates to a band wheel belt tightener which is provided with a hydraulic take-up device.

An object of this invention is to provide a hydraulic belt tightener of an improved construction.

A further object is to construct such a belt tightener that shall be self-regulating in its action.

A further object is to design the tightener so that it is only operative when the belt is in motion.

A further object is to construct a hydraulic belt tightener of the type to be disclosed which shall avoid all flexible connections for the members conveying the fluid.

Other objects of my invention will be apparent to those skilled in the art from the following description and appended claims.

Figure 2:
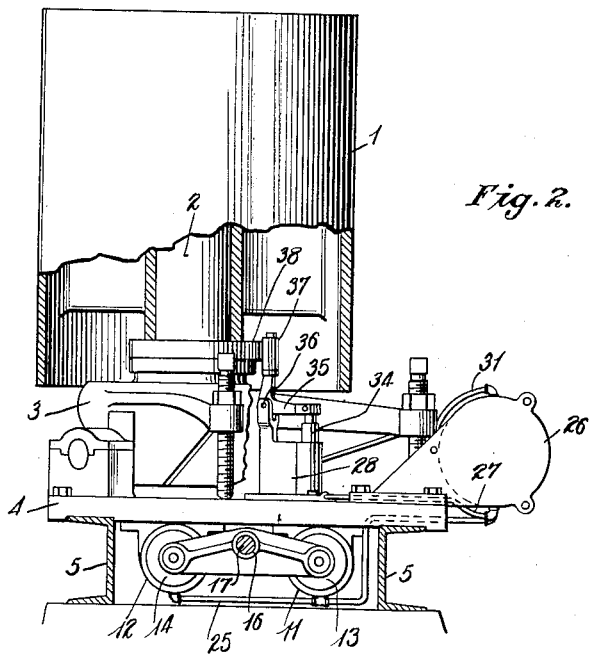
Figure 3:
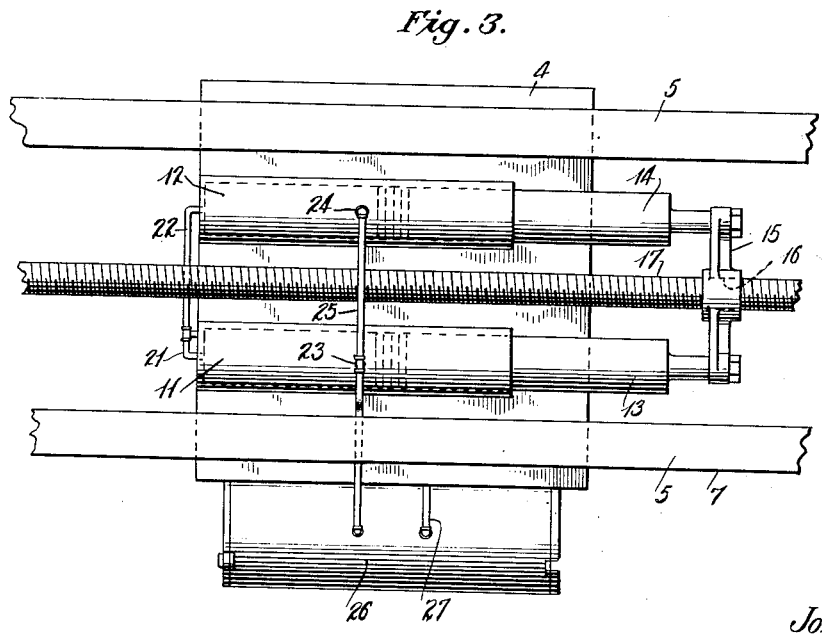

In the drawings accompanying the description,

Fig. 1 is a plan view of my belt tightener with the idler pulley partly cut away, Fig. 2 is a section along line 2—2 of Fig. 1, the idler pulley being partly in section, Fig. 3 is a bottom view of the carriage as shown in Fig. 1, Fig. 4 is a diagrammatic showing of the pipe connections involved.

The idler pulley 1 is mounted on a shaft 2 journaled in a support 3 mounted on a carriage 4. Carriage 4 is slidably mounted on the side ways 5 of a frame 7. Frame 7 has end braces 8 and 9, and is rigidly mounted on some suitable support. The carriage is moved, by my novel mechanism, which will be described in detail, to cause the idler pulley 1 to bear against a driven power belt 10 in order to take up any slack that might exist therein.

On the under side of carriage 4 are mounted two cylinders 11 and 12 which are closed at one end and which receive plungers 13 and 14 in the other end respectively of each of said cylinders. The outside ends of plungers 13 and 14 are yoked together by a yoke 15 provided with a threaded hole 16 into which the idler screw or shaft 17 is received. The shaft 17 is supported in the frame 7 by being journaled in the end braces 8 and 9 at 18 and 19 respectively. At one end the shaft 17 carries the handle 20 whereby the shaft 17 may be turned by hand to adjust the position of the yoke 15.

Pipes 21 and 22 are provided leading into the closed ends of cylinders 11 and 12 respectively. A fluid under pressure, preferably oil, is fed by pipes 21 and 22 into the cylinders 11 and 12 as will be described below. The movement of plungers 13 and 14 due to this fluid pressure is limited by the provision of two ports 23 and 24 provided respectively in cylinders 11 and 12. These ports communicate with a pipe 25, which leads to a reservoir 26 in which the fluid is stored.

A pipe 27 leads from the bottom of reservoir 26 to a pump 28 actuated in a manner to be described. A pipe 29 leads from the pump 28 to the pipes 21 and 22.

The maximum pressure which can be created by pump 28 in pipe 29 and consequently cylinders 11 and 12 is limited by a relief valve 30 located in a pipe 31 leading from pipe 29 to reservoir 26. The setting of valve 30 may be adjusted in any well known manner. In parallel with pipe 31 is a pipe 32 leading from pipe 29 to reservoir 26. In this pipe 32 a hand operated valve 33 is located.

Pump 28 includes a piston 34 connected to one arm of a bell crank 35. The bell crank is pivoted at 36 and carries the roller 37 on its other arm. A cam 38 is provided on the idler pulley 1 and actuates the bell crank lever and the piston 34 through the medium of the roller 37.

The operation of the belt tightener is as follows. To tighten the belt the pulley 1 is moved forward with the carriage 4 by means of the handle 20. When the belt 10 is in motion it causes the idler pulley 1 to revolve which in turn actuates the pump 28 to create a pressure in the pipe 29. Valve 33 being closed and valve 30 being set to the desired position the fluid pumped by 28 will be forced into the cylinders 11 and 12. Since the plungers 13 and 14 are fixed the cylinders will tend to move away from the plungers against the pressure of the belt 10. The pressure against the belt 10 is regulated by setting the relief valve 30. Thus a definite tension will be maintained on the belt 10 which thus avoids all slack.

If the belt 10 stretches beyond a certain degree the cylinders 11 and 12 will move to such an extent that plungers 13 and 14 will uncover ports 23 and 24. The fluid in cylinders 11 and 12 will now escape back to the reservoir 26 through pipe 25. Thus the movement of the idler carriage is limited by the location of the ports 23 and 24.

In order to reset the carriage 4 upon the belt 10 stretching to the extent indicated above, the valve 33 is opened for the purpose of allowing the pressure in cylinders 11 and 12 to be relieved. The handle 20 is then turned so as to take up the slack in the belt. Upon the valve 33 being closed, the pressure in pipe 29 is built up again by the pump 28 and the same amount of tension is maintained on the belt 10.

It is not necessary to maintain a pressure when the machinery is shut down and the belt is idle. In this device the pump ceases to operate when the belt is stopped and automatically resumes its operation upon the belt being set in motion.

By mounting the reservoir 26, the pump 28 and the cylinders 11 and 12 on the carriage 4, a rigid system of piping can be employed and a tight pressure system can be easily maintained.

Various changes may be made in this embodiment of my invention as will be apparent to those skilled in the art within the scope of the appended claims.

Having described my invention, I claim:

1. A belt tightener comprising a movable carriage, a belt tensioning member mounted on said carriage, hydraulic means for moving said carriage to press said tensioning member against a belt, said hydraulic means including a plurality of relatively movable elements, a reservoir for fluid, means for supplying fluid from said reservoir under pressure to said hydraulic means, at least one of said elements of said hydraulic means, said reservoir, and said pressure supplying means also being mounted on said carriage.

2. A belt tightener comprising a belt tensioning member, hydraulic means for pressing said belt tensioning member against a belt, said hydraulic means comprising a member connected to said belt tensioning member and a stationary second member cooperating with said last-named member, means for supplying a fluid under pressure between said last two named members, means for selectively adjusting the position of said stationary member and means for relieving the said fluid pressure so that said last-named means can be operated freely.

3. A belt tightener comprising a movable carriage, an idler pulley mounted on said carriage, hydraulic means comprising a cylinder and a cooperating piston, one of said last two members being carried by said carriage, the other of said members being fixed, means for supplying fluid under pressure to said cylinder, an exhaust port in said cylinder located at a predetermined point on said cylinder whereby the pressure in said cylinder drops upon said cylinder moving through a distance with respect to said piston so that said exhaust port is uncovered.

JOHN REID.